United States Patent [19]

Rowton

[11] 3,925,437

[45] Dec. 9, 1975

[54] REDUCTION OF ACIDITY OF ORGANIC POLYMERIC ISOCYANATES

[75] Inventor: Richard Lee Rowton, Austin, Tex.

[73] Assignee: Jefferson Chemical Company, Inc., Houston, Tex.

[22] Filed: July 18, 1974

[21] Appl. No.: 489,819

[52] U.S. Cl....260/453 SP; 260/2.5 AT; 260/2.5 AW; 260/77.5 AT; 260/77.5 NC; 260/453 AM
[51] Int. Cl.$^2$................................. C07C 119/042
[58] Field of Search............... 260/453 AM, 453 SP

[56] References Cited
UNITED STATES PATENTS

| | | | |
|---|---|---|---|
| 2,885,420 | 5/1959 | Spiegler | 260/453 |
| 3,793,362 | 2/1974 | Kolabowski et al. | 260/453 |

*Primary Examiner*—Lewis Gotts
*Assistant Examiner*—Dolph H. Torrence
*Attorney, Agent, or Firm*—James L. Bailey; John R. Kirk, Jr.

[57] ABSTRACT

The acidity of methylene-bridged polyphenyl polyisocyanate mixtures is reduced by mixing with the isocyanate mixture a lower alkylene oxide compound having from about 2 to about 4 carbons per molecule in an amount at least in excess of the stoichiometric amount, based upon the amount of acid present in the isocyanate. The admixing is preferably carried out at room temperature whereby the acidity of the isocyanate mixture is greatly reduced with no appreciable change in viscosity or equivalent weight. Methylene-bridged polyphenyl polyisocyanate mixtures treated by the process exhibit increased reactivity in the production of polyurethane and polyisocyanurate foams, elastomers and the like that have improved structural characteristics as compared to like materials prepared from untreated polyisocyanate mixtures.

9 Claims, No Drawings

REDUCTION OF ACIDITY OF ORGANIC POLYMERIC ISOCYANATES

BACKGROUND OF THE INVENTION

1. Field of the Invention

The invention relates to polymeric organic isocyanates produced by the well-known phosgenation of aromatic amines and more particularly pertains to a process for the reduction of acid levels in methylene-bridged polyphenyl polyisocyanate mixtures for increasing the reactivity and utility thereof. Methylene-bridged polyphenyl polyisocyanates are useful for the preparation of polyurethane and polyisocyanurate foams, elastomers and the like.

2. Description of the Prior Art

Organic isocyanates are generally prepared by the phosgenation of corresponding aromatic amines by one of the many well-known phosgenation processes. These phosgenation processes usually result in isocyanate products that contain residual acidic materials which adversely affect the reactivity of the isocyanate. The acidic material contaminants are generally those which respond as acids in standard analytical tests known and employed in the art. The acidic material contaminants are known to include hydrogen chloride and a wide variety of unknown byproduct materials of which only some appear to be hydrogen chloride precursors. These materials also respond as acids in the aforementioned standard analytical tests.

There are many procedures known for treating organic isocyanates to reduce acidity levels and otherwise increase their reactivity rate. For example, U.S. Pat. No. 3,264,336 discloses fractional distillation as a method for removing acid contaminants from isocyanates. In U.S. Pat. No. 3,516,950, it is disclosed the acidity in isocyanates can be reduced by volatilization of hydrogen chloride present such as by heating the isocyanate product at 150°–220°C. and passing an inert gas therethrough.

Other methods have been described that include the treatment of organic isocyanates with metals, e.g., iron, copper, zinc, aluminum, nickel, cobalt and the like, organic complexes of such metals and halides salts of such metals followed by separation of the resulting reaction by-products from the isocyanates by distillation or like procedures employing heat. See U.S. Pat. Nos. 3,155,699; 3,264,336; 3,373,182; and 3,458,558.

The aforementioned methods apparently result in some reduction of acidity in some isocyanate compounds to varying degrees. However, all these procedures require the exposure of the isocyanates to extremely high temperatures for extended periods of time. Methylene-bridged polyphenyl polyisocyanates are heat-sensitive and polymerize when heated to any substantial extent resulting in undesirable viscosity build-ups and, many times, changes in equivalent weight. These factors can limit the usefulness of the treated polyisocyanates in the manufacture of certain polyurethane and polyisocyanate products.

U.S. Pat. No. 3,793,362 discloses a process for reducing the acidity and hydrolyzable chloride content of certain polyphenyl polyisocyanates whereby the isocyanate materials are treated with from about 0.25 to 1.0 epoxy equivalents, per equivalent of acid present in the isocyanate, of a monomeric epoxide compound characterized by having at least one epoxy group present in a substituent attached to an aliphatic, cycloaliphatic or aromatic hydrocarbon or by having two terminal epoxy groups separated by the residue of a polyoxyalkylene glycol having a molecular weight of from about 100 to 700. More particularly, the epoxides are described as polyglycidyl ethers of aliphatic monohydroxy alcohols having 2 to 6 carbon atoms, monohydroxy aromatic compounds, polyhydric mononuclear and fused ring phenols, non-fused polynuclear phenols or novolak resins; diglycidyl ethers of aliphatic diols having 2 to 6 carbon atoms; and the aforesaid epoxide compounds characterized by having two terminal epoxy groups separated by the residue of a polyoxyalkylene glycol. It is disclosed that the process reduces the acidity and the hydrolyzable chloride content of the polyphenyl polyisocyanate without attendant separation or excessive heating required by prior art methods. Yet, it is further disclosed that the process is preferably carried out by heating the polyphenyl polyisocyanate mixture being treated to assist the blending of the described epoxide compounds therein, which are generally high molecular weight viscous compounds. However, even such treatment leaves much to be desired with respect to the results achieved.

I have now discovered that the acidity levels of methylene-bridged polyphenyl polyisocyanate mixtures can be substantially reduced in a single step without any adverse effect on viscosity, isocyanate equivalent weight or otherwise. The novel treatment process of the invention does not require subjecting the methylene-bridged polyphenyl polyisocyanate to any heating or separation steps associated with prior art processes prior to use in the manufacture of polyurethane or polyisocyanurate products, and thus does not suffer from the attendant disadvantages. In accordance with the present invention, methylene-bridged polyphenyl polyisocyanate mixtures are treated with a lower alkylene oxide compound.

Generally, lower alkylene oxide compounds, and epoxide compounds, have previously been employed in reaction processes for the reduction of known acid or acid-producing materials or systems. However, there is no suggestion in the prior art of employing lower alkylene oxides in the reduction of the acidity in isocyanate materials. The results of the present inventive process have been surprising inasmuch as the composition and reaction mechanisms of isocyanate acidic material contaminants are unknown and particularly in view of the high reactivity of lower alkylene oxides with many classes of compounds associated with the manufacture of polyurethane and polyisocyanurate products. Most unexpectedly it has been found that methylene-bridged polyphenyl isocyanate mixtures can be treated with lower alkylene oxides in very small amounts without adversely affecting the attendant reactions in the preparation of polyurethane and polyisocyanurate foams, elastomers and the like, yet the acidity of the isocyanates treated is substantially reduced.

SUMMARY OF THE INVENTION

The present invention comprises an improved process for the reduction of the acidity of organic polymeric isocyanates, particularly, methylene-bridged polyphenyl polyisocyanate mixtures, which comprises admixing with the isocyanate mixture a lower alkylene oxide compound having from 2 to 4 carbon atoms per molecule, in an amount at least in excess of the stoichiometric amount, based upon the amount of acid present in the isocyanate. The resulting isocyanate mixture has increased reactivity and can be employed without further treatment for the production of polyurethane and polyisocyanurate foams, elastomers and like materials. Materials produced exhibit improved cure rates and strength characteristics.

DETAILED DESCRIPTION OF THE INVENTION

Methylene-bridged polyphenyl polyisocyanate mixtures are well-known materials in the polyurethane and related arts. These isocyanate compounds are generally produced by the phosgenation of corresponding methylene-bridged polyphenyl polyamines which are conventionally produced by the reaction of formaldehyde and primary aromatic amines, such as aniline, in the presence of hydrochloric acid and/or acidic siliceous catalysts. Known processes for preparing the methylene-bridged polyphenyl polyamines and corresponding methylene-bridged polyphenyl polyisocyanates therefrom are described in the literature and many patents, for example U.S. Pat. Nos. 2,683,730; 2,950,263; 3,012,008; 3,344,162; and 3,362,979.

Methylene-bridged polyphenyl polyisocyanates prepared by the procedures known in the art contain acid contaminants that produce product acidity and adversely affect reactivity rates of these isocyanates. The term "acid", as used hereinabove and hereafter in this specification and claims, refers to free hydrogen chloride, its precursors such as carbamoyl chlorides and other unknown materials present in the isocyanate compounds that respond as acids in standard analytical tests. The acid content or level is readily determined by standard analytical tests such as ASTM D-1068, the procedure described in U.S. Pat. No. 3,793,362 or the procedure set forth hereafter. These standard analytical tests generally comprise heating the isocyanate in a solution of toluene and methanol, and titrating the resulting mixture with dilute potassium hydroxide. The quantity of potassium hydroxide required to neutralize the acidity of the mixture is employed to determine the percent of acid present by known formulation. The acidity is expressed as % HCl, whatever the acid-producing components actually are.

According to the present invention, the lower alkylene oxide compound and the methylene-bridged polyphenyl polyisocyanate mixture are admixed by the utilization of any conventional liquid mixing device. The mixing can be carried out batchwise or continuously in accordance with procedures well-known in the art. One of the primary advantages of the present invention is that the lower alkylene oxide compound is easily blended with the methylene-bridged polyphenyl polyisocyanate compound at ambient temperature. It has been found that the lower alkylene oxide compounds blend readily and intimately with methylene-bridged polyphenyl polyisocyanates at ambient temperatures in all proportions useful for the reduction of the acid present as more particularly described hereafter. It will be understood that the mixing of the two compounds can be carried out with heating the isocyanate, if desirable. However, such heating has not been found to improve the mixing and can result in an undesirable viscosity increase of the isocyanate being treated where the temperature is too high or the treatment prolonged.

The mixing operation should be carried out in the absence of moisture inasmuch as isocyanates are known to be susceptible to reaction with moisture. Any known procedure for admixing liquids in a dry atmosphere may be employed. Some examples of conventional techniques include the utilization of an inert gas atmosphere, such as nitrogen, the control of humidity in an atmosphere, and the like.

The lower alkylene oxide compound employed in the present invention has from 2 to about 4 carbon atoms per molecule and no more than one oxirane group and is preferably a compound selected from the group consisting of ethylene oxide, 1,2-propylene oxide, 1,2-butylene oxide, 2,3-butylene oxide, 1,2-isobutylene oxide and mixtures thereof. These lower molecular weight compounds are relatively inexpensive and have been found to substantially reduce the acidity in methylene-bridged polyphenyl polyisocyanate mixtures when employed in significantly small amounts, as described more particularly hereafter. Moreover, the employment of these compounds does not appreciably change the viscosity or the equivalent weight of the isocyanate being treated. Ethylene oxide, propylene oxide and mixtures thereof are especially preferred lower alkylene oxides.

The lower alkylene oxide compound is admixed with the isocyanate mixture in an amount at least in excess of the stoichiometric amount, based upon the acid present in the isocyanate mixture being treated. The term "stoichiometric amount" as used herein is the theoretical amount of lower alkylene oxide compound required to react with the amount of acid present in the isocyanate compound as determined by the standard analytical tests described hereinabove, the acid being expressed as hydrogen chloride. The theoretical reaction would be:

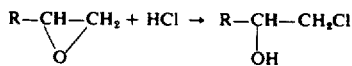

Since the chlorohydrins derived from the lower alkylene oxides are relatively small molecules, they modify the isocyanates less than those derived from larger, more complex materials heretofore employed.

Preferably, the lower alkylene oxide compound is employed in an amount within the range of an amount slightly in excess of the stoichiometric amount to about 300% excess of the stoichiometric amount. An amount within the range from about 50% excess to about 100% excess of the stoichiometric amount is especially preferred. The lower alkylene oxide compound can be employed in amounts of more than 300% excess of the stoichiometric amount without producing any adverse effects on the isocyanate, but no further increase in the reduction of acidity has been observed. The utilization of higher amounts is uneconomical and can possibly affect the reaction of the isocyanate with polyethers and/or polyols in the manufacture of the polyurethane and polyisocyanurate products.

The stoichiometric amount of the particular alkylene oxide employed can be readily determined by one having ordinary skill in the art without undue experimentation such as by initially determining the acid content of the particular isocyanate being treated by any of the standard analytical tests mentioned hereinbefore and then applying the known molecular weight of the desired alkylene oxide to the known formulation based upon the above theoretical reaction.

The process of the invention is particularly useful for the reduction of the acidity of methylene-bridged polyphenyl polyisocyanate mixtures containing about 20 to about 100 wt.% methylene diphenylisocyanate isomers and the remainder being polymethylene polyphenylisocyanates having higher functionalities and higher molecular weights. The process is especially useful for reducing the acidity of methylene-bridged polyphenyl polyisocyanate mixtures containing about 20 to 100 wt.% methylene diphenylisocyanate isomers, of which about 20 to about 95 wt.% thereof is the 2,4'-isomer, and the remainder being polymethylene polyphenylisocyanates of higher molecular weight and functionality, that have an average functionality of from about 2.2 to about 2.7. These isocyanate mixtures are known, commercially available materials and can be prepared by the process described in U.S. Pat. No. 3,362,979, issued Jan. 9, 1968 to Floyd E. Bentley, which is incorporated herein by reference as if copied in full.

The methylene-bridged polyphenyl polyisocyanate mixtures treated in accordance with the present invention can be employed in any known process for the manufacture of polyurethane and polyisocyanurate foams, elastomers and the like within about 2 hours after admixture with the lower alkylene oxide without further processing or separation. The treated polyisocyanate mixtures have increased reactivity and result in the production of polyurethane and polyisocyanurate materials having improved rates of cure and strength.

In view of the extensive documentation of polyurethane and polyisocyanurate manufacture, a specific discussion thereof will not be set forth herein.

The invention will be further illustrated by the following specific examples which are given by way of illustration and not as limitations on the scope of this invention. The various data relating to acid levels were obtained as follows.

Acidity Determination 1.2 to 1.4 g. of the isocyanate mixture to be analyzed is weighed, to the nearest 0.1 mg., into each of two 250-ml. beakers. 50 ml. of methanol and then 50 ml. of toluene are pipetted into each beaker. A stirring bar is added to each beaker which are then placed on a preheated (maximum heat) stirrer hotplate. Thermometers are placed in each solution and the solutions are heated to 60°C. in less than three minutes. The beakers are then removed from the hotplate, covered with watch glasses and allowed to stand for one hour, plus or minus 5 minutes. With a pipette, the thermometers and the walls of each beaker are washed down with 10 ml. methanol. Using a pH meter with glass and calomel electrode, each solution is then titrated with 0.02N methanolic sodium hydroxide, to pH 7. The acidity, determined as HCl, is then calculated according to the following formula:

$$\text{Wt.\% Acid (Basis HCl)} = \frac{\text{(ml. of NaOH) (N of NaOH) (3.646)}}{\text{grams of sample}}$$

EXAMPLE 1

To an appropriate reaction vessel having a means for stirring mounted therewith is charged 400 g. of a methylene-bridged polyphenyl polyisocyanate mixture containing about 65 wt.% of methylenediphenylisocyanate isomers of which about 24% is the 2,4'-isomer, and the remainder being polymethylene polyphenyl isocyanates of higher molecular weight and higher functionality which has an average functionality of about 2.3 (THANATE P-220, Jefferson Chemical Company, Inc., Houston, Tex.). The isocyanate mixture has an isocyanate equivalent number of 135.5, a viscosity of about 85 centipoises (at 25°C.) and an acidity, determined as HCl, of 0.050 wt.%. 0.4 g., about 25% excess of the stoichiometric amount, basis acid present in the isocyanate, of propylene oxide is also charged to the vessel with mixing during addition. The compounds are mixed for about 10 minutes at room temperature and then allowed to stand with the reaction vessel being closed for about 72 hours. Upon analysis, the treated isocyanate mixture has an acidity of only 0.030 wt.%, determined as HCl, with no appreciable change in viscosity or equivalent weight.

EXAMPLES 2–13

In Examples 2–13, the methylene-bridged polyphenyl polyisocyanate mixture described in Example 1 and a methylene-bridged polyphenyl polyisocyanate mixture containing about 46% by weight methylene diphenylisocyanate isomers, of which about 20% is the 2,4'-isomer, and the remainder being higher functionality and higher molecular weight polymethylene polyisocyanates which has an average functionality of about 2.7 (THANATE P-270, Jefferson Chemical Company, Inc., Houston, Tex.), are treated according to the procedure described in Example 1 with propylene oxide, ethylene oxide, a commercial epoxy resin comprised of the diglycidyl ether of Bisphenol A having an epoxy eq.wt. of about 190 (ARALDITE 6005, Ciba-Geigy, Ardsley, N.Y.) and epichlorohydrin in varied amounts in excess of the stoichiometric amount, based upon the amount of acid present determined as HCl, as set forth in the following Table I. In each example, the mixtures were analyzed for % acidity after standing for at least 24 hours.

Table I

| Example No. | Polymeric Isocyanate | Isocyanate Grams | Treatment Compound Name | % excess[3] | Acidity, determined as HCl, wt.% Before Treatment | After Treatment |
|---|---|---|---|---|---|---|
| 2 | A[1] | | propylene oxide | 100 | 0.050 | 0.026 |
| 3 | B[2] | | propylene oxide | 50 | 0.060 | 0.042 |
| 4 | A | | ethylene oxide | 100 | 0.050 | 0.026 |
| 5 | B | | ethylene oxide | 50 | 0.060 | 0.040 |
| 6 | B | | ethylene oxide | 40 | 0.122 | 0.058 |
| 7 | B | | Araldite 6005 | 50 | 0.060 | 0.045 |
| 8 | A | | epichlorohydrin | 0 | 0.050 | 0.036 |
| 9 | A | | epichlorohydrin | 100 | 0.050 | 0.032 |
| 10 | A | | epichlorohydrin | 300 | 0.050 | 0.030 |
| 11 | B | | epichlorohydrin | 0 | 0.060 | 0.052 |
| 12 | B | | epichlorohydrin | 100 | 0.060 | 0.047 |

Table I-continued

| Example No. | Polymeric Isocyanate | Isocyanate Grams | Treatment Compound Name | % excess[3] | Acidity, determined as HCl, wt.% Before Treatment | After Treatment |
|---|---|---|---|---|---|---|
| 13 | B | | epichlorohydrin | 300 | 0.060 | 0.045 |

[1]THANATE P-220, Jefferson Chemical Company, Inc.
[2]THANATE P-270, Jefferson Chemical Company, Inc.
[3]% excess, by weight, of the stoichiometric amount, based upon the weight % acid present, determined as HCl, in the isocyanate.

A comparison of the results set forth in Table I illustrate that lower alkylene oxides, e.g., ethylene oxide and propylene oxide, are more efficient in the reduction of acidity of isocyanates at room temperature than a higher molecular weight polyepoxide compound (Araldite 6005) or other epoxides (epichlorohydrin). A comparison of Examples 4, 5 and 6 to the other Examples of Table I show that ethylene oxide is the most efficient acid reducer of the materials tested in the amount employed.

EXAMPLE 14

To each of five pint-bottles was charged 450 g. of a methylene-bridged polyphenyl polyisocyanate mixture containing about 65 wt.% of methylenediphenylisocyanate isomers of which about 24% is the 2,4'-isomer having an average functionality of about 2.3 (THANATE P-220, supra). The polyisocyanate mixture contained 0.084 wt.% acid, determined as HCl. A 0.8 g. aliquot of ethylene oxide (70% excess over the stoichiometric amount) was added to each of the pint bottles containing the polyisocyanate mixture at predetermined time intervals such that all the samples could be analyzed for acidity at the same time, with the ethylene oxide and polyisocyanate having been in contact with each other for various elapsed times. Each bottle was rolled for 30 minutes after the addition of ethylene oxide. The results are set forth in the following Table II.

Table II

| Elapsed time, hrs. | Acidity,%,as HCl |
|---|---|
| 0 | 0.084 |
| ½ | 0.064 |
| 1 | 0.057 |
| 2 | 0.050 |
| 6 | 0.050 |
| 24 | 0.049 |

A comparison of the results of Table II illustrate the rapidity of acidity reduction in the treated isocyanate mixture upon treatment with ethylene oxide at room temperature. Table II also shows that acidity reduction is practically complete in only about two hours.

The viscosity and equivalent weight of the untreated isocyanate mixture were compared with those values for one of the above-described treated samples that had stood for about 48 hours after the addition of ethylene oxide. The viscosities were determined by employing a No. 4 LV spindle attached to an LVT Brookfield Viscometer operated at 12 rpm.

| Sample | Viscosity, cps, at 25°C. | Eq.wt. |
|---|---|---|
| Untreated | 96 | 132.8 |

-continued

| Sample | Viscosity, cps, at 25°C. | Eq.wt. |
|---|---|---|
| Treated | 90 | 133.5 |

The above comparison shows that the above-described ethylene oxide treatment has only a minor effect upon viscosity and equivalent weight values of the isocyanate mixture.

EXAMPLE 15

A recirculating loop is attached to a suitable 55-gallon isocyanate storage tank to provide a prototype of an acid-reducing system. The recirculating loop is comprised of a recirculating pump and appropriate conduits for recirculating an isocyanate material in the storage tank. A syringe pump is mounted ahead of the recirculating pump for injecting a treatment material into the system. 183 lbs. of a methylene-bridged polyphenyl polyisocyanate mixture having a functionality of about 2.7 and containing about 46 wt.% methylene diphenylisocyanate isomers, of which 21% is the 2,4'-isomer, and higher molecular weight and higher functionality materials (THANATE P-270, supra) is charged to the storage tank. The isocyanate mixture has an isocyanate equivalent number of 133, a viscosity of 165 centipoises (at 25°C.), and an acidity of 0.12 wt.% (determined as HCl). The isocyanate mixture is circulated through the recirculating loop while 200 ml. of propylene oxide is injected into the system by the syringe pump, a 50% excess of the stoichiometric amount, based upon the amount of acid present in the isocyanate. Analysis of the treated isocyanate mixture after 24 hrs. standing showed that the acidity is reduced from 0.12 wt.% to only 0.05 wt.%.

EXAMPLE 16

To illustrate the increased reactivity of isocyanate mixtures treated in accordance with the process of the invention, two samples of typical 20-lb. density, water-blown rigid urethane foam were prepared, the first sample being prepared by the employment of the untreated isocyanate mixture described in Example 15 (0.12 wt.% acidity), and the second sample being prepared by the utilization of the propylene oxide-treated isocyanate mixture described in said Example 15 (0.05 wt.% acidity). The two samples, otherwise identically prepared, consisted of decorative panels prepared from approximately 600 g. of material in a 1 × 12 × 15½ inch elastomeric mold. The foam formulation for each sample panel was:

| | Parts by Weight |
|---|---|
| Rigid polyol[1] | 47.2 |
| DC-193 silicone | 0.5 |
| N,N,N',N'-Tetramethyl-1,3- | |

-continued

| | Parts by Weight |
|---|---|
| propanediamine | 0.3 |
| Water | 0.2 |
| Isocyanate | 51.8 |

¹The rigid polyol was a 70:30 part by weight blend of a propylene oxide adduct of sorbitol having a hydroxyl number of 490 and the propylene oxide adduct of glycerine, hydroxyl number 240.

For each sample, the ingredients were mixed with a suitable mechanical mixer for 20 seconds and poured into the mold. After 6½ minutes, removal of the respective panels was started. The differences in cure behavior of the two panel samples, i.e. "green strength", was measured by placing one sample at a time onto a green-strength testing jig in one minute from removal from the mold. The testing jig consisted in part of two stationary parallel rods 13 inches long and 9 inches apart. The panel sample being tested was laid across the parallel rods and third rod equipped with a yoke was then placed on top of the panel sample parallel to the two stationary supporting rods and spaced half-way between them. Twenty pounds of weights were then added to the yoke at "zero" time. The extent of panel warpage (mm. of deflection) was measured at various times after the weights were added. The final extent of warpage was taken as a measure of the green strength of each sample panel. The results are set forth in the following Table III.

TABLE III

| Sample | Millimeters Deflection After Various Times | | |
|---|---|---|---|
| | 15 sec. | 135 sec. | 435 sec. |
| Untreated Isocyanate | 2.5 | 10.5 | 11.0 |
| Treated Isocyanate | 2.5 | 4.0 | 4.5 |

As illustrated by a comparison the results set forth in Table III, the first panel sample, prepared with the untreated isocyanate of Example 15 (0.12 wt.% acidity) had a maximum deflection of 11 mm. The second panel sample, prepared from the oxide-treated isocyanate of Example 15 (0.05 wt.% acidity) had a maximum deflection of only 4.5 mm., measured at the same time.

EXAMPLE 17

In this example, the effect of isocyanate acidity on the gel time of a typical urethane two-component elastomer system was compared. Two elastomer samples were prepared using the exact same ingredients, except that untreated isocyanate was employed in one sample and an alkylene oxide-treated isocyanate was used in the other. The untreated isocyanate was a methylene-bridged polyphenyl polyisocyanate mixture containing about 65 wt.% of methylene diphenylisocyanate isomers of which about 24% is the 2,4'-isomer and having an average functionality of about 2.3 (THANATE P-220, supra). The mixture contained 0.093% acid, determined as HCl. The treated isocyanate was a portion of this methylene-bridged polyphenyl polyisocyanate mixture that had been previously treated with a 50% stoichiometric excess of propylene oxide by the procedure described in Example 1. The treated isocyanate mixture contained 0.048% acid, determined as HCl. The A-component of each elastomer sample consisted of 7.12 parts by weight of the isocyanate mixture. The B-component of each sample consisted of 99.8 parts by weight of a 6,500 molecular weight triol, i.e. a propylene oxide-ethylene oxide adduct of trimethylolpropane, containing 13% ethylene oxide with 50% of the hydroxyl groups being primary (THANOL SF-6500, Jefferson Chemical Company, Inc., Houston, Tex.), and 0.2 parts by weight phenylmercuric propionate. In preparing each urethane elastomer sample, 100 g. of the B-component was mixed with 7.12 g. of the A-component in a 5-ounce paper cup for 75 seconds with a tongue depressor. A thermometer and a No. 4 LV spindle attached to an LVT Brookfield Viscometer were immersed into each mix. An initial temperature measurement and viscosity reading (12 rpm) were taken at 3 minutes after the components were first combined. Readings of temperature and viscosity were taken every 2 minutes until a viscosity of 20,000 cps was reached. This time was taken as the "working time". The time of maximum exotherm (temperature) was noted. When the viscosity got too great for the test instrument the spindle was withdrawn and the "gel time" was observed. The gel time was taken as the time required for the curing elastomer mixture to reach a gelled condition such that when a glass rod was touched to the surface and rapidly withdrawn, the material pulled up by the rod quickly broke rather than stringing and running. The results for each elastomer sample are set forth in the following Table IV.

TABLE IV

| | Isocyanate | |
|---|---|---|
| Properties at 3 min. | Untreated | Treated |
| Viscosity, cps. | 1200 | 1200 |
| Temperature, °C. | 29.5 | 29.5 |
| Working Time, min. | 19.8 | 16.5 |
| Maximum Exotherm | | |
| Temperature, °C. | 40.5 | 41.0 |
| Time, min. (Max.Exotherm) | 25 | 20.5 |
| Gel Time, min. | 25 | 20.5 |

A comparison of the results of the above Table IV illustrates the improved cure characteristics obtained in the described elastomer system through the employment of an isocyanate mixture treated in accordance with the inventive procedure for acidity reduction.

Having thus described my invention, what is claimed is:

1. A process for the reduction of the acidity of methylene-bridged polyphenyl polyisocyanate mixtures which comprises:

admixing a methylene-bridged polyphenyl polyisocyanate mixture of methylene diphenylisocyanate isomers and higher functionality polymethylene polyphenylisocyanates with a lower alkylene oxide compound containing from 2 to about 4 carbon atoms per molecule, said lower alkylene oxide compound being admixed in an amount at least in excess of the stoichiometric amount, based upon the amount of acid present in the methylene-bridged polyphenyl polyisocyanate mixture.

2. A process in accordance with claim 1 wherein said lower alkylene oxide compound is a compound selected from the group consisting of ethylene oxide, propylene oxide, 1,2-butylene oxide, 2,3-butylene oxide, isobutylene oxide and mixtures thereof.

3. A process in accordance with claim 1 wherein said lower alkylene oxide compound is mixed with said methylene-bridged polyphenyl polyisocyanate mixture in an amount up to 300% excess of said stoichiometric amount, based upon said amount of acid present.

4. The process in accordance with claim 1 wherein said lower alkylene oxide compound is ethylene oxide, said ethylene oxide being mixed with said methylene-bridged polyphenyl polyisocyanate compound in an amount at least in excess of said stoichiometric amount up to about 100% excess of said stoichiometric amount.

5. The process in accordance with claim 1 wherein said lower alkylene oxide is propylene oxide, said propylene oxide being mixed in an amount at least in excess of said stoichiometric amount up to about 100% excess of said stoichiometric amount.

6. The process in accordance with claim 1 wherein said methylene-bridged polyphenyl polyisocyanate mixture and said lower alkylene oxide compound are admixed at ambient temperature.

7. The process in accordance with claim 1 wherein said methylene-bridged polyphenyl polyisocyanate mixture contains from about 20 to about 100 weight % methylene diphenylisocyanate and the remainder higher functionality methylene-bridged polyphenyl polyisocyanates, said mixture having an average functionality of from about 2.2 to about 2.7.

8. The method in accordance with claim 7 wherein said lower alkylene oxide compound is a compound selected from the group consisting of ethylene oxide, propylene oxide, 1,2-butylene oxide, 2,3-butylene oxide, isobutylene oxide and mixtures thereof.

9. The method in accordance with claim 7 wherein said lower alkylene oxide compound is added in an amount of from an amount at least in excess of said stoichiometric amount to about 300% excess of said stoichiometric amount.

* * * * *